No. 799,807. PATENTED SEPT. 19, 1905.
H. N. SPORBORG.
BLOCK SIGNAL SYSTEM.
APPLICATION FILED APR. 24, 1902.
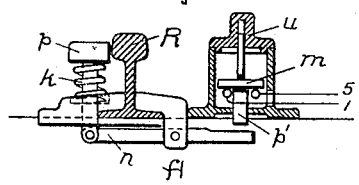
Fig. 2.
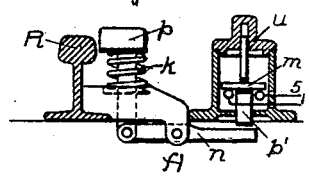
Fig. 3.
Fig. 1.
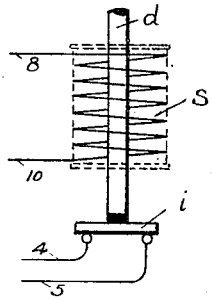
Fig. 4.
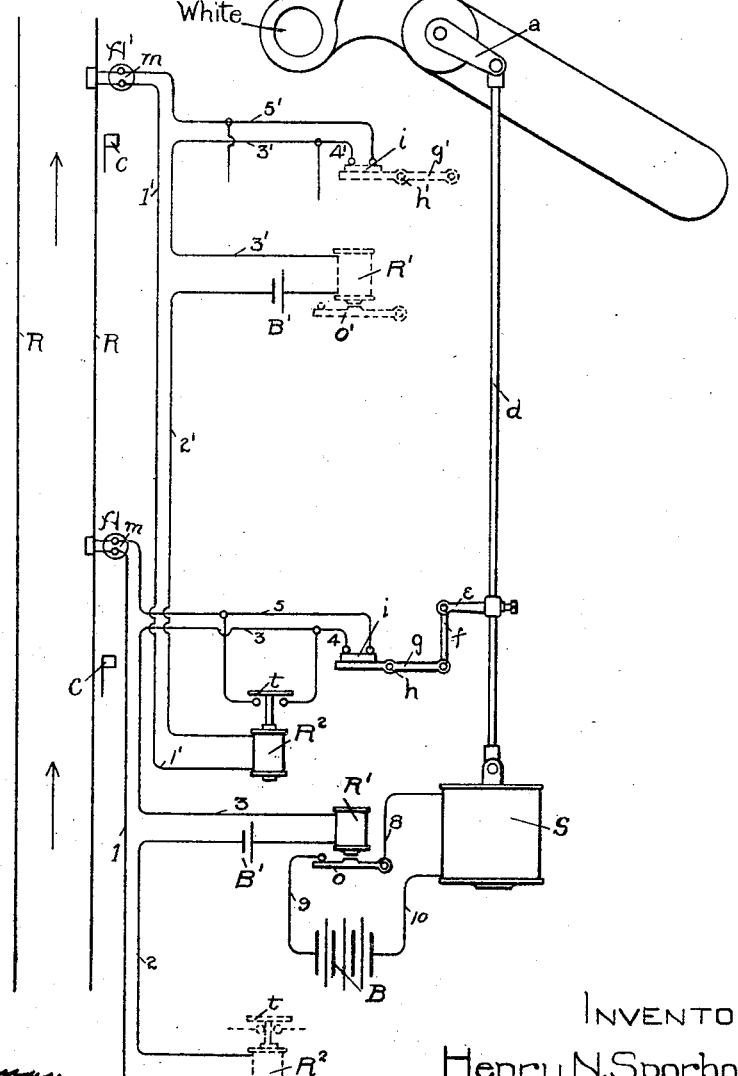
WITNESSES:
Rob't C. Chapman
Helen Orford
INVENTOR:
Henry N. Sporborg.
by Albert G. Davis
Atty.

UNITED STATES PATENT OFFICE.

HENRY N. SPORBORG, OF SCHENECTADY, NEW YORK, ASSIGNOR TO GENERAL ELECTRIC COMPANY, A CORPORATION OF NEW YORK.

BLOCK-SIGNAL SYSTEM.

No. 799,807.　　　　Specification of Letters Patent.　　　　Patented Sept. 19, 1905.

Application filed April 24, 1902. Serial No. 104,442.

*To all whom it may concern:*

Be it known that I, HENRY N. SPORBORG, a citizen of the United States, residing at Schenectady, in the county of Schenectady, State of New York, have invented certain new and useful Improvements in Block-Signal Systems, of which the following is a specification.

The present invention relates to systems of block-signaling as applied to railways, and is especially applicable to double-track roads or roads on which the traffic is continuous in one direction over any given track.

My invention consists of an electrically-operated signal controlled by track lever-switches operated by the wheels of the car or by other suitable operating mechanism as the car enters or leaves a block or section which it is desired to protect. Each of the said track lever-switches is located between the sections or blocks and when actuated opens a normally closed relay-circuit, which in turn acts upon the main signal-controlling circuits to throw the signal of the section which that car is about to enter to its "danger" position, and the signal of the section which that car is leaving to its "clear" position. In this system the track-rails are not used as part of the electrical circuits.

My invention is especially useful on electric railways, such as the modern high-speed interurban roads. The system does not interfere with the operation of cars or trains against traffic, but does not protect these trains when so operated.

Figure 1 is a diagrammatic representation of the signal-operating devices and the connections thereto. Fig. 2 is a sectional view of one form of track lever-switch. Fig. 3 is a similar view of a modified form of track lever-switch, and Fig. 4 is a diagrammatic view of a modified arrangement of the switch for maintaining the relay-circuit open.

Referring now to Fig. 1, A and A' represent the track lever-switches located along the track R, the distance between A and A' representing one block or section of the road on which but a single car or train is allowed at any one time. The signal or semaphore represented by C may be placed beside the track a short distance in advance of the track lever-switch A. The signal is maintained normally in its clear position by means of the solenoid S, energized by the battery or other source of electrical power B. Included in the circuit through the battery B and the solenoid S is the armature $o$ of a relay R', the coil of which is normally energized by the battery B' or other source of power. The coil of the relay R' is in circuit with the track lever-switch A and also with a switch $i$, which is operated by the movement of the rod $d$, connected to the signal C by means of the arm $a$. When the solenoid S becomes deënergized, the signal C drops to its danger position by gravity, thereby raising the rod $d$, and with it the arm $e$, to which is attached one end of the link $f$, the lower end of which is connected with the switch lever-arm $g$, pivoted at a fixed point $h$. The relay $R^2$ is controlled by the track lever-switch A' and operates to normally maintain the switch $t$ open. The switch $t$ operates to close the circuit through the relay R', which circuit has been opened by the track lever-switch A and maintained open by the operation of the switch $i$.

The operation of this system is as follows: A car moving in the direction of the arrow operates the track lever-switch A, thereby momentarily opening the normally closed circuit through the conductor 1, coil of relay $R^2$, (relay shown dotted,) connected with the signal of the block or section which the car is just leaving, conductor 2, battery B', relay R', conductors 3 and 4, switch $i$, conductor 5, and switch $m$ of track lever-switch A. The relay R', being thus deënergized, drops the armature $o$, thereby opening the main signal-operating circuit, which is normally closed through conductor 9, battery B, conductor 10, solenoid S, conductor 8, and armature $o$. The signal C then drops to its danger position and raises the rod $d$, thereby opening the auxiliary switch $i$, which maintains the circuit through the coil of relay R' open and the signal at "danger" after the track lever-switch A has closed until the car reaches the end of the section or block and actuates the track lever-switch A'. The operation of the track lever-switch A' opens the normally closed circuit through conductor 1', coil of relay $R^2$, conductor 2', battery B', coil of relay R', (relay shown dotted,) conductor 3', switch $i$, (shown dotted,) said battery B', relay R', and switch $i$ being located at the signal belonging to the section which the car enters on leaving the track lever-switch A'. The relay $R^2$ is thus deënergized and the switch $t$ allowed to close, thereby closing the circuit through the coil of relay R', which in turn closes the circuit through the solenoid S, energizing the said solenoid and throwing the signal C to its clear position and also closing the switch i, thus leaving the signal-operating device ready to be again operated by the track lever-switch A. It will be readily seen that the switch t of the relay R² (shown in dotted lines) of one block or section will remain closed until the said relay R² becomes reënergized by the operation of the relay R² (shown in full lines) of the following section.

In Fig. 2 I have shown a form of track lever-switch which is operated by the flange of the car-wheel, while in Fig. 3 I have shown a similar switch operated by the tread of the car-wheel. In each of these figures p represents the plunger, which is normally maintained in the position shown by the spring k, but on being depressed operates, through the lever n and the plunger p', to raise the switch m away from its fixed contacts. The switch m resumes is normal position by gravity. The switch m is protected from moisture and accident by being inclosed in the protecting-casing u.

In place of the lever connections to the switch i shown in Fig. 1 I may use the construction shown in Fig. 4, mounting the switch i on the lower end of the core of the solenoid s in such a manner that it will open the relay-circuit when the rod d is raised.

By using a system in which the electric circuits are normally closed it will be readily seen that any disarrangement of the said circuits would be immediately indicated by the signal dropping to its danger position, which position it would hold until the fault had been remedied.

Although I have shown and described certain specific means for carrying out my invention, I do not intend to limit myself to such means, as many modifications can be made without departing from the spirit and scope of my invention.

What I claim as new, and desire to secure by Letters Patent of the United States, is—

1. In a block-signal system, an electrically-operated signal, a normally closed electrical circuit in which said signal is located, a switch in said circuit, a magnet controlling said switch, an independent normally closed electric circuit in which the actuating-coil of said magnet is located, and a switch in said magnet-circuit adapted to be engaged and operated by a passing train to open said magnet-circuit to cause said signal to move to danger position.

2. In a block-signal system, an electrically-operated signal, an electrical circuit in which said signal is located, a relay for controlling said circuit, an independent normally closed electric circuit in which the actuating-winding of said relay is located, a switch operated by a passing car for opening the relay-circuit, and an independent switch operatively connected with said signal for maintaining said relay-circuit open.

3. In a block-signal system, an electrically-operated signal, an electrical circuit in which said signal is located, a relay for controlling said circuit, an independent normally closed electrical circuit in which the actuating-coil of said relay is located, means operated by a passing car for momentarily opening the relay-circuit, a separate switch operatively connected with said signal for maintaining said relay-circuit open, and a switch independent of said switches for closing said relay-circuit.

4. In a block-signal system, an electrically-operated signal, an electrical circuit in which said signal is located, a relay for controlling said circuit, an independent normally closed electrical circuit in which the actuating-winding of said relay is located, a switch operated by a passing car for momentarily opening said relay-circuit, a separate switch operatively connected with said signal for maintaining said relay-circuit open, and an electromagnetically-operated switch for closing said relay-circuit.

5. In a block-signal system, an electrically-operated signal, an electrical circuit in which said signal is located, a relay for controlling said circuit, an independent normally closed electrical circuit in which the actuating-winding of said relay is located, a switch operated by a passing car for momentarily opening said relay-circuit, a separate switch operatively connected with said signal for maintaining said relay-circuit open, an electromagnetically-operated switch for closing said relay-circuit, and independent means for controlling said electromagnetic switch.

6. In a block-signal system, an electrically-operated signal, a normally closed electric circuit in which said signal is located, a relay for controlling said circuit, a normally closed independent electric circuit in which the actuating-winding of said relay is located, a switch operated by a passing car for momentarily opening said relay-circuit, a separate switch operatively connected to said signal for maintaining said relay-circuit open after it has been opened by said first-mentioned switch, an electromagnetically-operated switch for closing said relay-circuit, and a switch operated by a passing car for controlling said electromagnetically-operated switch.

7. In a block-signal system, a normally closed switch adapted to be engaged and opened momentarily by a passing car, a relay, the actuating-coil of which is in circuit with said switch, said relay controlling an electric circuit in which a signal is located, a second relay having its actuating-coil also in circuit with said switch, said second relay controlling means for actuating a second signal.

8. In a block-signal system, a track divided into blocks or sections, an electrically-operated signal for each section, a switch between two consecutive sections adapted to be engaged and operated by a passing car, means controlled by said switch for throwing the signal of one section to its "danger" position, and means controlled by the same switch for throwing another of said signals to its "clear" position.

9. In a block-signal system, a track divided into blocks or sections, an electrically-operated signal for each section, a switch adapted to be engaged and operated by the car, an electric circuit in which said switch is connected, a relay in said circuit adapted to cause one of said signals to assume its "danger" position, and a second relay in said circuit adapted to cause another of said signals to assume its "clear" position.

10. In a block-signal system, a relay for controlling the operation of the signal in each block, the actuating-winding of the relay being included in circuit with a suitable source of current in a normally closed electric circuit, and means adapted to be operated by a passing car for opening said circuit and for causing the simultaneous closing of a corresponding circuit for the actuating-winding of the relay controlling the signal in another block.

11. In a block-signal system, a relay for controlling the operation of the signal in each block, the actuating-winding of the relay being included in circuit with a suitable source of current in a normally closed electric circuit, means adapted to be operated by the passing of a car into the block for momentarily opening the circuit of the relay which controls the signal for that block, means adapted to maintain said circuit open when the signal is in the "danger" position, and means adapted to be operated by the passing of a car into a succeeding block for closing said circuit.

12. In a block-signal system, a relay for controlling the operation of the signal in each block, the actuating-winding of the relay being included in circuit with a suitable source of current in a normally closed electric circuit, means adapted to be operated by the passing of a car into the block for momentarily opening the circuit of the relay which controls the signal for that block, a switch connected to be actuated to open said circuit when the signal is in the "danger" position, and means adapted to be operated by the passing of a car into a succeeding block for closing a shunt-circuit around said switch.

13. In a block-signal system, an electromagnet for controlling the operation of a signal device in each block, the winding of said electromagnet being included in circuit with a suitable source of current in a normally closed electric circuit, a switch adapted to be operated by a passing car for momentarily opening said circuit, a second switch arranged to be operated to maintain said circuit open when the signal is in the "danger" position, and a third switch adapted to be operated by a car passing into the next block in advance and momentarily closing a shunt-circuit around the terminals of said second switch.

14. In a block-signal system, an electrically-operated signal, a normally closed electrical circuit in which said signal is located, a switch in said circuit, a magnet controlling said switch, an independent normally closed electric circuit in which the actuating-coil of said magnet is located, a switch in said magnet-circuit adapted to be engaged and operated by a passing train to open said magnet-circuit to cause said signal to move to danger position, and means for maintaining said magnet-circuit open until the train has reached a predetermined point.

In witness whereof I have hereunto set my hand this 22d day of April, 1902.

HENRY N. SPORBORG.

Witnesses:
BENJAMIN B. HULL,
HELEN ORFORD.